US012652355B2

(12) United States Patent
Durán Alcaide et al.

(10) Patent No.: US 12,652,355 B2
(45) Date of Patent: Jun. 9, 2026

(54) MME WRITER AND IDENTITY SERVICE FOR RAN PARSER

(71) Applicant: TC France S.A.S., Saint-Jacques de la Lande (FR)

(72) Inventors: Angel Durán Alcaide, Pontevedra (ES); Juan José Rubio Esteban, València (ES); Maria Amparo Navarro Peris, València (ES); Rubén Rosell Saborit, Castelló (ES)

(73) Assignee: TC France S.A.S., Saint-Jacques-de-la-Lande (FR)

( * ) Notice: Subject to any disclaimer, the term of this patent is extended or adjusted under 35 U.S.C. 154(b) by 294 days.

(21) Appl. No.: 18/461,024

(22) Filed: Sep. 5, 2023

(65) Prior Publication Data

US 2024/0080393 A1 Mar. 7, 2024

Related U.S. Application Data

(60) Provisional application No. 63/442,926, filed on Feb. 2, 2023, provisional application No. 63/404,444, filed on Sep. 7, 2022.

(51) Int. Cl.
*H04M 15/00* (2024.01)
*H04M 3/22* (2006.01)
(52) U.S. Cl.
CPC ......... *H04M 15/41* (2013.01); *H04M 3/2218* (2013.01)
(58) Field of Classification Search
CPC .................................. H04M 15/00; H04M 3/22
See application file for complete search history.

(56) References Cited

U.S. PATENT DOCUMENTS

2007/0004396 A1 1/2007 Connelly
2011/0075675 A1 3/2011 Koodli et al.
(Continued)

FOREIGN PATENT DOCUMENTS

EP 3668014 A1 6/2020
FR 3668014 * 3/2022 ............. H04L 12/24
WO 2017025904 A1 2/2017

OTHER PUBLICATIONS

D.S.C. Reddy; Kanamathareddy Reshma Reddy, Ran Method That Performs Nested Scalable No SQL Transaction and Data Analytics, Mar. 9, 2020 International Journal of Advanced Research in Engineering and Technology (IJARET) vol. 11, Issue 1, Jan. 2020, pp. 30-37, Article ID: IJARET_11_01_005 ISSN Print: 0976-6480 and ISSN Online: 0976-6499 [online]. Retrieved from the Internet: <URL: http://www.iaeme.com/IJARET/issues.asp?JType=IJARET &VType=11&IType=1>.
(Continued)

*Primary Examiner* — Myron Wyche
(74) *Attorney, Agent, or Firm* — Baratta Law PLLC; Lawrence A. Baratta, Jr.

(57) ABSTRACT

A method includes receiving data from one or more of (i) a data stream from one or more sources and (ii) a file, wherein the one or more sources are from systems associated with a mobile network; analyzing and summarizing relevant information from the data stream, wherein the relevant information includes data associated with user identities; transforming the relevant information included into a common output format, wherein the common output format is a same format for one or more vendor's equipment and one or more wireless technologies; and storing the relevant information in in-memory storage.

20 Claims, 5 Drawing Sheets

(56)  References Cited

U.S. PATENT DOCUMENTS

| | | |
|---|---|---|
| 2013/0044705 A1 | 2/2013 | Akhtar et al. |
| 2014/0341109 A1 | 11/2014 | Cartmell et al. |
| 2015/0250006 A1 | 9/2015 | Ke |
| 2016/0373944 A1 | 12/2016 | Jain et al. |
| 2018/0198924 A1 | 7/2018 | Kovács et al. |
| 2019/0215694 A1 | 7/2019 | Rubin et al. |
| 2019/0364532 A1 | 11/2019 | Jain et al. |

OTHER PUBLICATIONS

Anssi Tauriainen, Can you hear me now? A call detail record based end-to-end diagnostics system for mobile networks, Feb. 27, 2020. 1st International Workshop on Analytics for Service and Application. Downloaded on Sep. 15, 2022 at 09:40:10 UTC from IEEE Xplore. 978-3-903176-24-9 © 2019 JFIP.

* cited by examiner

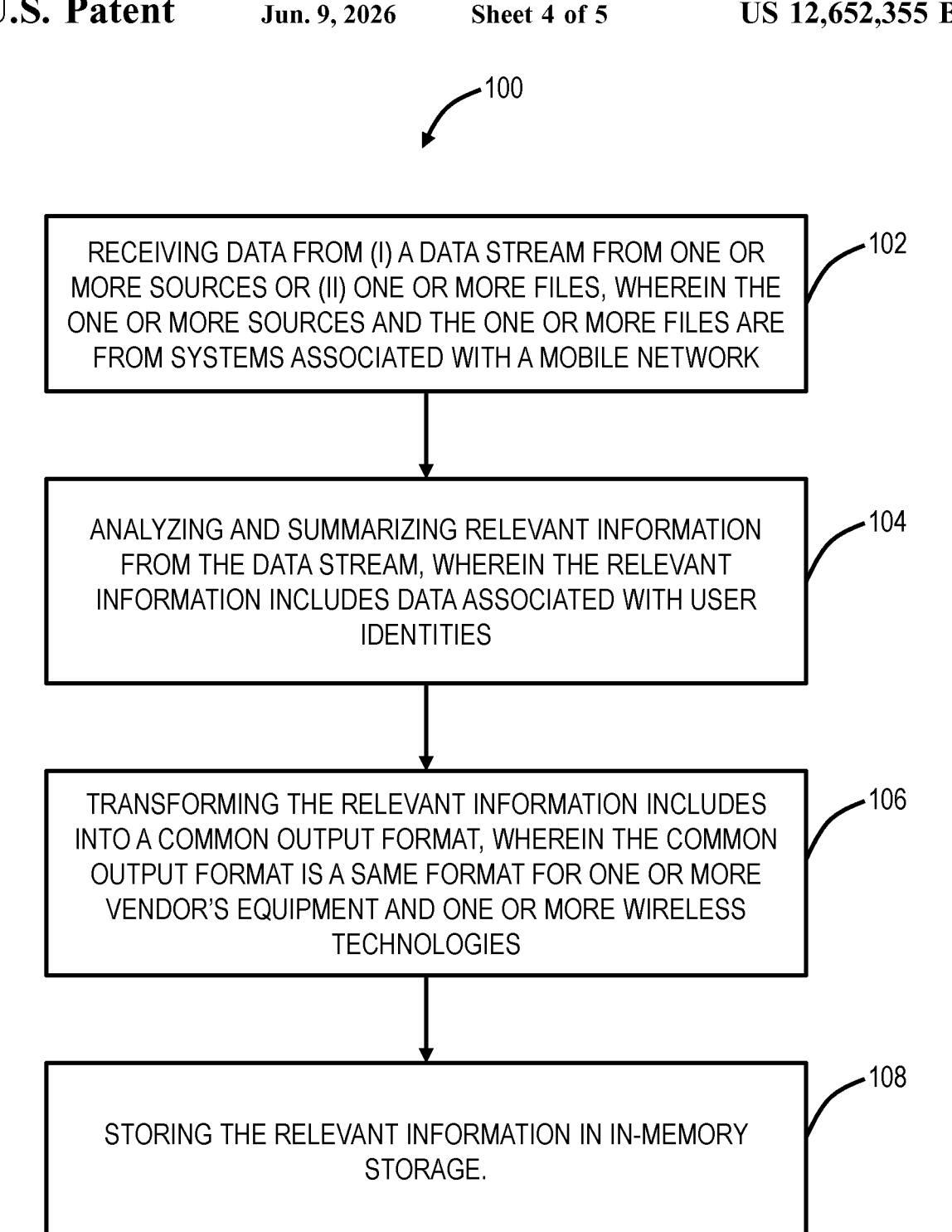

RECEIVING DATA FROM (I) A DATA STREAM FROM ONE OR MORE SOURCES OR (II) ONE OR MORE FILES, WHEREIN THE ONE OR MORE SOURCES AND THE ONE OR MORE FILES ARE FROM SYSTEMS ASSOCIATED WITH A MOBILE NETWORK

102

ANALYZING AND SUMMARIZING RELEVANT INFORMATION FROM THE DATA STREAM, WHEREIN THE RELEVANT INFORMATION INCLUDES DATA ASSOCIATED WITH USER IDENTITIES

104

TRANSFORMING THE RELEVANT INFORMATION INCLUDES INTO A COMMON OUTPUT FORMAT, WHEREIN THE COMMON OUTPUT FORMAT IS A SAME FORMAT FOR ONE OR MORE VENDOR'S EQUIPMENT AND ONE OR MORE WIRELESS TECHNOLOGIES

106

STORING THE RELEVANT INFORMATION IN IN-MEMORY STORAGE.

MME WRITER AND IDENTITY SERVICE FOR RAN PARSER

CROSS-REFERENCE TO RELATED APPLICATION(S)

The present disclosure claims priority to U.S. Provisional Patent Application No. 63/442,926, filed Feb. 2, 2023, and U.S. Provisional Patent Application No. 63/404,444, filed Sep. 7, 2022, the contents of each are incorporated by reference in their entirety.

FIELD OF THE DISCLOSURE

The present disclosure relates generally to networking and computing. More particularly, the present disclosure relates to systems and methods for a Mobile Management Entity (MME) writer and Identity Service for a Radio Access Network (RAN) parser.

BACKGROUND OF THE DISCLOSURE

In a telecommunications network, there are solutions for planning, troubleshooting and optimizing mobile networks using dynamic, geo-located devices, and subscriber data. A RAN Data Processing System (also referred to herein as a Parser, a RAN parser, and a parsing agent) is a scalable software adapter which collects and processes 2G, 3G, 4G and 5G 3rd Generation Partnership Project (3GPP) and vendor-specific RAN procedure events to generate procedure records and, optionally geolocated procedure records and real time location insights. The main output of RAN parser is a RAN user data record based on the messages provided by the network and procedures in the network. This requires a correlation between different sources and messages found in the customer's information. And the aim is to provide the data record as soon as possible, not waiting for the end of the procedure.

BRIEF SUMMARY OF THE DISCLOSURE

The present disclosure relates to systems and methods for a Mobile Management Entity (MME) writer and Identity Service for a Radio Access Network (RAN) parser. The RAN parser is vendor and technology agnostic, and the present disclosure includes techniques for managing subscriber identities and providing an enrichment source for real time use cases. The present disclosure includes receiving streaming data provided by third party sources; decoding, picking and summarizing the relevant information from data sources; and transforming and storing information into vendor agnostic format. The present disclosure includes a mechanism for synchronization, avoiding clock synchronization with data consumers [timestamp not based on exact time/date, relative time]. The present disclosure also includes a mechanism for querying stored subscriber information in a vendor agnostic way. Of note, data record generation is providing records for different signaling procedures that appear during the call, and the various descriptions utilize the term "procedures" for the different signaling procedures that occur during a call. That is, the term procedure is used to denote something related to signaling that occurs during the call.

In various embodiments, the present disclosure can include a method having steps, a processing device configured to implement the steps, and a non-transitory computer-readable medium storing instructions for programming one or more processors to implement the steps. The steps include receiving data from (i) a data stream from one or more sources or (ii) one or more files, wherein the one or more sources and the one or more files are from systems associated with a mobile network; analyzing and summarizing relevant information from the data stream, wherein the relevant information includes data associated with user identities; transforming the relevant information includes into a common output format, wherein the common output format is a same format for one or more vendor's equipment and one or more wireless technologies; and storing the relevant information in in-memory storage.

The steps can further include receiving a query from a service for identity values; and utilizing a key from the query to obtain the identity values from the in-memory storage. The service can be configured to process Call Trace Messages, and the query relates to a user associated with the Call Trace Messages. The service can perform the query responsive to associated Call Trace Messages failing to include the identity values. The one or more sources can include any of Mobile Management Entity (MME) data, probe data. and third party data. The receiving can utilize a message queue. The receiving, the analyzing and summarizing, the transforming, and the storing can be performed at an edge of the mobile network. The steps can further include determining a alignment of procedures based on the relevant information. The in-memory storage can include any of an encrypted and unencrypted format for the relevant data. The transforming can include synchronization of timestamps based on a timestamp difference and an identifier. The in-memory storage can include storage of keys and values.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a flowchart of a process for managing subscriber identities and providing an enrichment source for real time use cases, in a RAN Parser.

DETAILED DESCRIPTION OF THE DISCLOSURE

Figure 1:
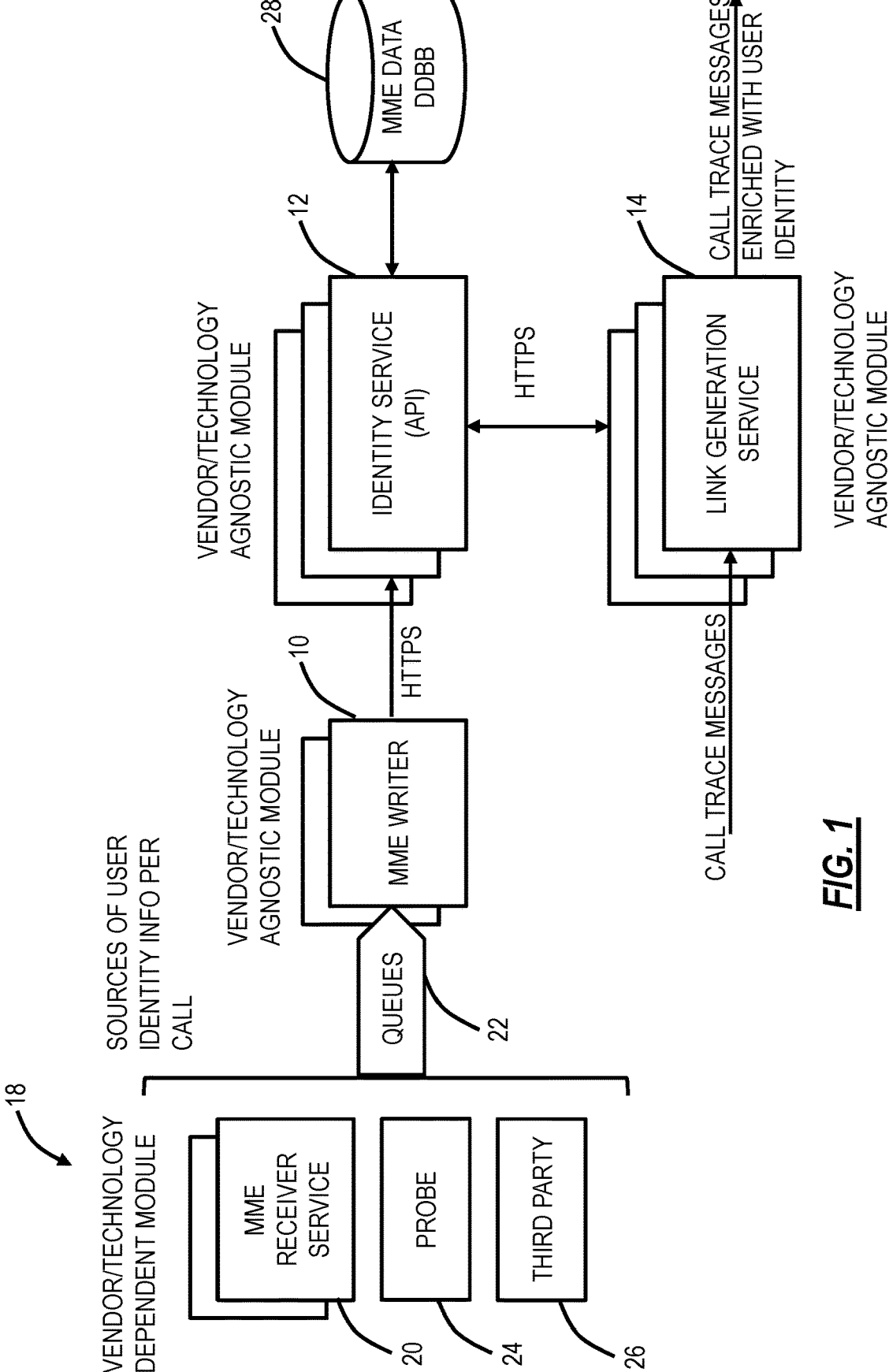
FIG. 1 is a diagram of an MME Writer and an Identity Service for use in a RAN Parser.

Again, the present disclosure relates to systems and methods for a Mobile Management Entity (MME) writer and Identity Service for a Radio Access Network (RAN) parser. The RAN parser is vendor and technology agnostic, and the present disclosure includes techniques for managing subscriber identities and providing an enrichment source for real time use cases.

The present disclosure includes a Cloud Native Parser that reproduces the behavior of the current Parsers via a new architecture that requires changes in terms of how the information is processed how it is distributed along the different elements, how it is generated and how it is sent out of the system. The Cloud Native Parser aims to replace the legacy architecture making it more flexible and able to be deployed in several pieces along different locations (edge, central, etc.) in a customer network in front of the monolithic version where only the central site deployment was allowed.

RAN Parser

RAN parsers require Call Traces (CTs) as inputs. CTs are generated by Network Elements (NEs) from the client's mobile network and have a vendor proprietary format depending on the vendor itself: e.g., Huawei, Nokia, Ericsson, Samsung, ZTE . . .

the technology of the mobile network: 2G, 3G, 4G, 5G, etc.

the trace format: e.g., there are Huawei 4G traces in format "TRC" and Huawei 4G traces in format SDTSIG, and not only the format changes but also the content (there is information present in one but not in the other and vice versa)

the trace release: there can be internal changes between vendor release X.1 and vendor release X.2 of a certain trace format (changes in existent information, addition of new information, deprecation of existent information)

The present disclosure includes a RAN parser that is multi-vendor and multi-technology, meaning it supports (1) as many as possible input format variations described above, and (2) provides outputs with a common structure for all of them (agnostic output). In order to address a RAN parser that is multi-vendor, multi-technology, the present disclosure includes an approach to convert the input into a vendor/technology agnostic format as soon as possible in the system pipeline, limiting the impact of input variation evolutions to a single module, simplifying the processing after the ingestion and decreasing the computation power.

In 2G and 3G, the information describing the events during a call and the information about the identity of the user performing the call come together in the same Call Trace. In 4G and 5G, these two kinds of information are retrieved from separate data sources due to a different treatment of sensitive data such as user identities. Therefore, in 4G and 5G there are two main kinds of Call Traces that need to be ingested by the Parser:

a) the ones describing the events during calls; and b) the ones with the identity information of the users performing those calls (the user itself and the mobile device used).

Both data sources need to be ingested, processed, and correlated at a certain point so the Parser can generate outputs containing both. Since clients request near real time outputs, the correlation must be done near real time as well. The Parser must also be able to encrypt sensitive data to comply with the law.

The Parser element described herein provides a methodology of storing the user identity information by an MME Writer, and a methodology of retrieving the correlated information by an Identity Service when asked by other system modules (the ones creating the near real time global outputs with insights of both calls and users). The Parser also supports all vendor and technology formats of the Call Traces a) and b).

MME Writer and Identity Service for RAN Parser

FIG. 1 is a diagram of an MME Writer 10 and an Identity Service 12 for use in a RAN Parser. The MME Writer 10 and the Identity Service 12 rely on agnostic data from other modules and work agnostically themselves. These elements have the following characteristics both can be deployed at the edge instead of in a centralized monolithic location We correlate a) information present in the call trace with b) user identifiers of the user performing the call, which are not present in the call trace and are obtained from other data sources We correlate in near real time, providing the identity of the user to a Link Generation Service 14 while it is generating its output summarizing the events in a procedure (Procedure Data Record). Note that the PDR will be generated anyway, even without the user identity information, if the Identity Service 12 is not able to provide it in time for the PDR being generated (near real time)

Correlation is vendor agnostic performed by configuration within the MME Writer 10 that allows to select which fields are used and combined per vendor Sensitive data encryption can be performed at the Identity Service 12 for security reasons, other embodiments are also contemplated such as at the MME Writer 10. Encrypted and unencrypted format are managed the same way making any element in the chain unaware of the format The Identity Service 12 abstracts the in-memory storage technology used Synchronization is simplified by means of relative time calculations and avoiding using absolute timestamps Storage format is configurable (default storage format is optimized for retrieval)

Most of the Key Performance Indicators (KPIs) and algorithms need to discriminate data for the different users. The information of which user each call belongs to is not available in the Call Trace files and is obtained from other types of files such as the ones generated by the MMEs (Network Elements). Since many of the calculations depend on having such information as soon as possible, it is necessary to correlate both sources of information in near real time.

Data sources 18 include an MME Receiver Service 20 that transforms data received from an MME into topics stored in Queues 22, probes 24 which store output in the Queues 22, and third party components 26 which allow customers to inject MME data directly to the Queues 22 using their own topic. The Queues 22 store all messages coming from the different data sources. Note, in an embodiment, the system can be implemented in a message queue such as Apache Kafka. In the Apache Kafka Queueing system, messages are saved in a queue fashion. This allows messages in the queue to be ingested by one or more consumers, but one consumer can only consume each message at a time. The Queue topic in the Apache Kafka Queue will contain the messages to be processed.

The MME Writer 10 is a module that reads the different messages from the Queues 22 and sends extracted data to the Identity Service 12. The Identity Service 12 can be a Representational State Transfer (REST) Application Programming Interface (API) that centralizes all accesses to an identity storage 28 which can be in-memory data structure store used as a database or cache. A Link Generation Service 14 is configured to link messages together, and while processing a procedure, asks the Identity Service 10 to get the user identifiers (International Mobile Subscriber Identity (IMSI)/Subscription Concealed Identifier (SUCI), International Mobile Station Equipment Identity Software Version (IMEISV), of note, there are other identifiers as well including ones embedded in the aforementioned identifiers) using timestamps and internal procedure identifiers as keys for the request. It will generate its output even without user identifiers if the Identity Service 10 is not able to provide them.

MME Writer

The MME Writer 10 module can read any topic and any schema from the queue 22 (such as in AVRO format), so it can be attached to different topics at the same time. Example of input schema provided by the MME Receiver Service 20:

TABLE 1

Example of schema provided by MME Receiver Service

| Field | Type | Description |
|---|---|---|
| timestamp_utc_ms | int64 | Timestamp of the message in milliseconds (UNIX format) |
| time_zone_correction | int32 | Time zone correction |
| timestamp_dst_cor | int32 | Day Light Save Time Correction |
| mme_ue_s1ap_id | int64 | mme_ue_s1ap_id or amf_ue_ngap_id depending on the technology. Uniquely identifies the UE association over the S1 interface within the MME or NG interface within the AMF |
| enb_ue_s1ap_id | int64 | enb_ue_s1ap_id or ran_ue_ngap_id depending on the technology. Uniquely identifies the UE association over the S1 interface within a eNB or NG interface within an gNB |
| imsi | int64 | International Mobile Subscriber Identity |
| imeisv | int64 | International Mobile Equipment Identity |

If the input schema does not contain time zone and DST (Daylight Saving Time) values, the timestamp value can be considered in UTC (Unix Time). When time zone and DST are present, configurable rules can be applied to the Timestamp value to do the transformation, e.g., Timestamp+Timezone−DST.

The MME Writer 10 is agnostic about the input. The user can configure how to combine input fields to create the outputs needed from each topic. At this point, not only a field mapping between input and output is needed but also information of how to transform some specific fields, mainly related to timestamps.

EXAMPLES timestamp is divided in two input fields (date and time)
timestamp is in UTC or in local time
timestamp is in UNIX format or in plain format
For output, the MME Writer 10 uses a REST API (the Identity Service 12) to communicate with the in-memory storage 28, so it is isolated from the type of storage used. It provides two different outputs—Synchronization and Key/Value.

For Synchronization: newer timestamp difference read from MME plus the identifier of the MME Writer 10. It is used later by the Link Generation Service 14 to know if identity data related to the message being currently processed is already available in the identity database or not yet. The use of timestamp difference or 'lag' instead of real timestamp simplifies the process synchronization (if one instance of the MME Writer 10 is removed, there is no need to manage the entry left by it in the database)

Implementation example:
stored value: [current timestamp]−[min timestamp sent to storage in the period]
condition for requesting a value from storage: [current-_timestamp]−[event time]>min(max(stored value [MME Writer])+margin, Max allowed)
For Key/Value: list of parameters (MME Data to be stored in the identity database) so the Identity Service 12 can build the pair Key-Value and store it in in-memory storage 29. The use of generic 'Key/Value' allows the correlation to be vendor agnostic since the selection of the fields and how to combine them can be configured per vendor.

Figure 2:
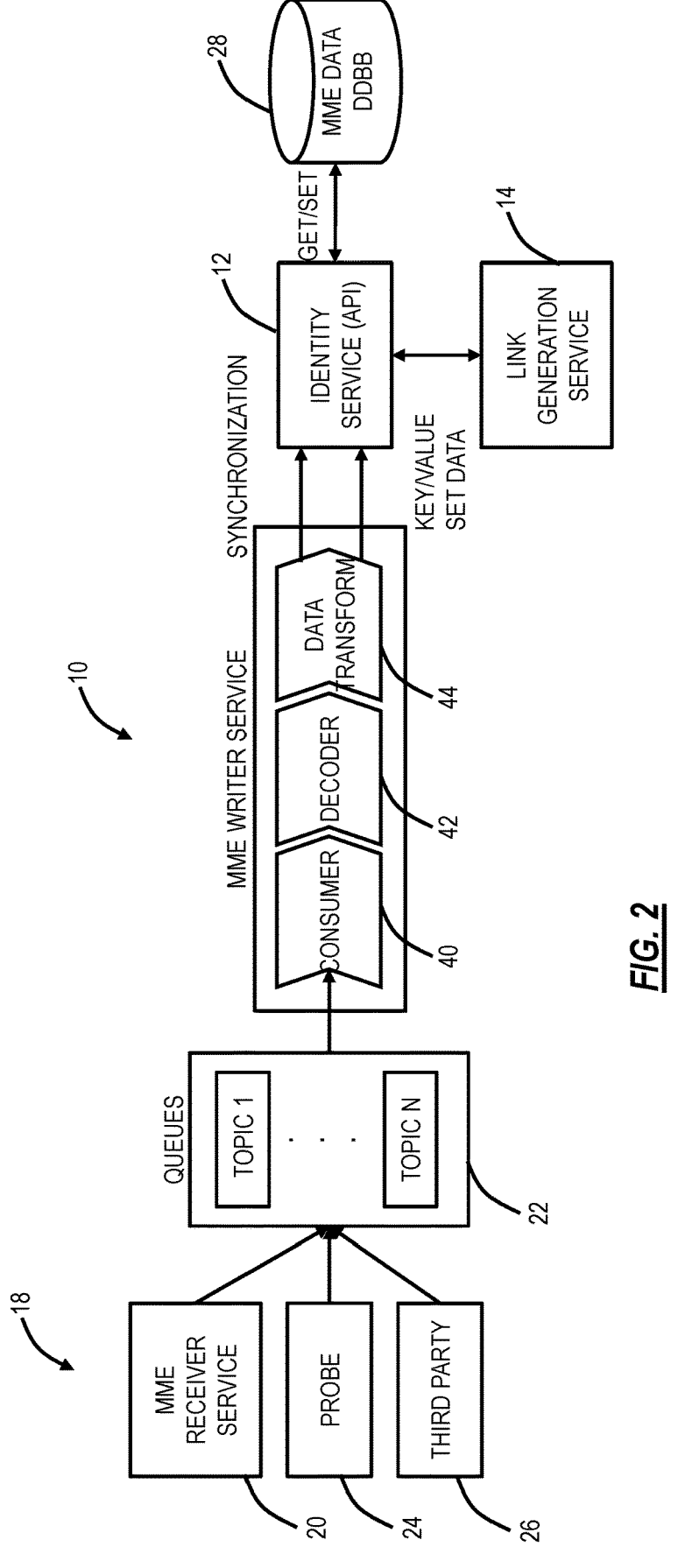
FIG. 2 is a diagram of details of the MME Writer.

FIG. 2 is a diagram of details of the MME Writer 10. The MME Writer 10 includes a consumer 40 receiving the topics (or messages) in the Queues 22, a decoder 42, and a data transformation module 44.

Identity Service

Figure 3:
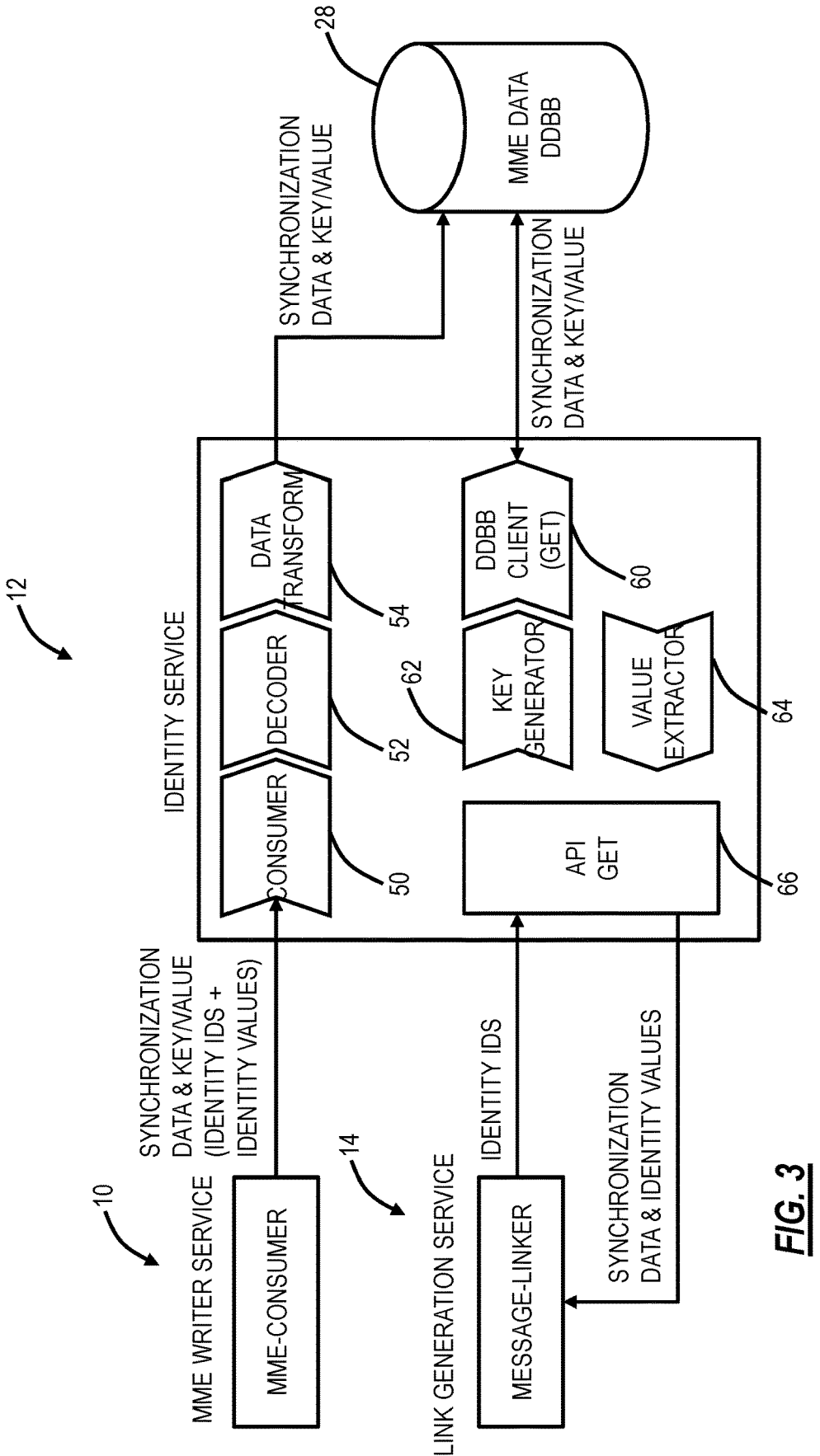
FIG. 3 is a diagram of details of the Identity Service.

FIG. 3 is a diagram of details of the Identity Service 12. Similar to the MME Writer 10, the Identity Service 12 includes a consumer 50 configured to consume data from the MME Writer 10, a decoder 52, and a data transformation module 54 connected to the in-memory storage 28. The Identity Service 12 also includes a client 60 connected to the in-memory storage 28, a key generator 62, a value extractor 64, and an API 66 connected to the Link Generation Service 14.

The Identity Service 12 manages all connections between different modules and the MME Data in-memory storage 28, being the only service having a dependency with it. The Identity Service 12 is agnostic to the in-memory storage 28 technology used, providing a REST API for ingesting and querying user identity information from the user identity database.

The Identity Service 12 can store the information provided by the MME Writer 10:

Synchronization as a hashmap for the Latencies (lags) of all the MME Writers 10.

Identity information as key/value, a format allowing a performant retrieval of the data and a granular configuration of the buckets.

The Key/value format storage is vendor independent. Storage is performed in two nested key levels allowing the storage on top of the same first level key of several second level keys. It allows a more performant insertion and retrieval as well as decreasing the hardware footprint optimizing the mapping.

The keys are created with a combination of Timeslot (that indicates the time bucket and can be discretized at minutes or seconds level), enodeb_s1_apID and mme_s1_apid. An example of possible combination is:

Key1: Timeslot+a set of first bytes of enodeb_s1_apID
Key2: remaining bytes of enodeb_s1_apID+ mme_s1_apid Within the value, any identity information can be saved an example could be a combination of International Mobile Subscriber Identity (IMSI), International Mobile Equipment Identity (IMEI), Mobile Network Code (MNC), Mobile Country Code (MCC), and Tracking Area Code (TAC).

The Identity Service 12 can be a REST API that can expose a couple of endpoints:

mme_synchronization:
used by the MME Writer Service 12 to store synchronization data into the database
used by the Link Generation Service 14 to read synchronization data from the database (returns the maximum stored value for all the consumers)

mme_identity:
used by the MME Writer 10 to store key/value pairs into the database
used by the Link Generation Service 14 to get identity values from the database for a given key REST API is agnostic about what is the content and the format of the key/values. It is configurable externally how key and value are built from input fields. Specific storage transformations are performed, IE: timestamp resolution, number of characters that are part of field and data. In addition, it encrypts sensitive data. Also, the MME Writer 10 can also provide encryption.

Process

FIG. 4 is a flowchart of a process 100 for managing subscriber identities and providing an enrichment source for real time use cases, in a RAN Parser. The process 100 can be implemented by the MME Writer 10 and the Identify Service 12, as part of a RAN Parser. The process 100 contemplates implementation as a method having steps, via a processing device configured to implement the steps, via a cloud service configured to implement the steps, and/or as non-transitory computer-readable medium with instructions that, when executed, cause one or more processors to implement the steps.

The process 100 includes receiving data from (i) a data stream from one or more sources or (ii) one or more files, wherein the one or more sources and the one or more files are from systems associated with a mobile network (step 102); analyzing and summarizing relevant information from the data stream, wherein the relevant information includes data associated with user identities (step 104); transforming the relevant information includes into a common output format, wherein the common output format is a same format for one or more vendor's equipment and one or more wireless technologies (step 106); and storing the relevant information in in-memory storage (step 108).

The process 100 can further include receiving a query from a service for identity values; and utilizing a key from the query to obtain the identity values from the in-memory storage. The service can be configured to process Call Trace Messages, and the query can relate to a user associated with the Call Trace Messages. The service can perform the query responsive to associated Call Trace Messages failing to include the identity values. The one or more sources can include any of Mobile Management Entity (MME) data, probe data. and third party data. The receiving can utilize Apache Kafka.

The receiving, the analyzing and summarizing, the transforming, and the storing can be performed at an edge of the mobile network. The process 100 can further include determining a data record based on the relevant information. The in-memory storage can include any of an encrypted and unencrypted format for the relevant data. The transforming can include synchronization of timestamps based on a timestamp difference and an identifier. The in-memory storage can include storage of keys and values.

Processing System

Figure 5:
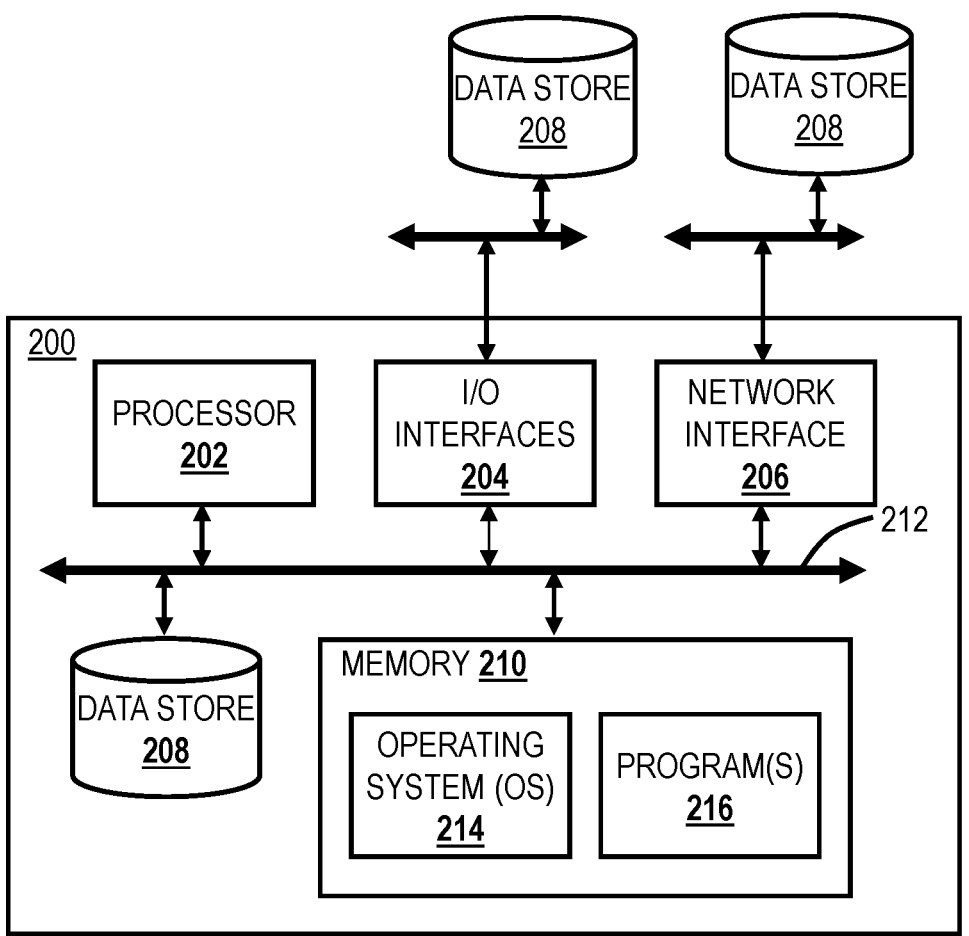
FIG. 5 is a block diagram of a processing system, which may be used to implement the process.

FIG. 5 is a block diagram of a processing system 200, which may be used to implement the process 100. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, one or more processing devices 200 can be configured in a cluster and/or in a cloud system, for implementing the process 100. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   receiving data from (i) a data stream from one or more sources or (ii) one or more files, wherein the one or more sources and the one or more files are from systems associated with a mobile network and comprise call trace messages in a plurality of vendor-specific formats corresponding to a plurality of different wireless technologies;
   analyzing and summarizing relevant information from the data stream, wherein the relevant information includes data associated with user identities and is processed in near real time by a vendor- and technology-agnostic radio access network parser;
   transforming the relevant information into a vendor- and technology-agnostic common output format, wherein the common output format is a same format for one or more vendor's equipment and one or more wireless technologies; and
   storing the relevant information in in-memory storage comprising an in-memory data structure store used as a database or cache.

2. The method of claim 1, wherein the steps further include:
   receiving a query from a service for identity values; and
   utilizing a key from the query to obtain the identity values from the in-memory storage, the key comprising a combination of a time slot indicating a time bucket and one or more procedure identifiers associated with network elements, the identity values being stored as key/value data in the in-memory storage.

3. The method of claim 2, wherein the service is configured to process Call Trace Messages, and the query relates to a user associated with the Call Trace Messages.

4. The method of claim 2, wherein the service performs the query responsive to associated Call Trace Messages failing to include the identity values.

5. The method of claim 1, wherein the one or more sources include any of Mobile Management Entity (MME) data, probe data, and third party data.

6. The method of claim 1, wherein the receiving utilizes a message queue.

7. The method of claim 1, wherein the receiving, the analyzing and summarizing, the transforming, and the storing is performed at an edge of the mobile network.

8. The method of claim 1, wherein the steps further include:
   determining an alignment of procedures based on the relevant information.

9. The method of claim 1, wherein the in-memory storage includes any of an encrypted and unencrypted format for the relevant data.

10. The method of claim 1, wherein the transforming includes synchronization of timestamps by computing a timestamp difference between a current timestamp and a minimum timestamp for a period and associating the timestamp difference with an identifier of an MME writer instance, the timestamp difference and an identifier being stored as synchronization data in the in-memory storage for use by a link generation service to determine whether identity data related to a message being processed is already available.

11. The method of claim 1, wherein the in-memory storage includes storage of keys and values.

12. A processing system comprising:

one or more processors; and memory storing instructions for programming the one or more processors to receive data from (i) a data stream from one or more sources or (ii) one or more files, wherein the one or more sources and the one or more files are from systems associated with a mobile network and comprise call trace messages in a plurality of vendor-specific formats corresponding to a plurality of different wireless technologies;

analyze and summarize relevant information from the data stream, wherein the relevant information includes data associated with user identities and is processed in near real time by a vendor- and technology-agnostic radio access network parser;

transform the relevant information into a vendor- and technology-agnostic common output format, wherein the common output format is a same format for one or more vendor's equipment and one or more wireless technologies; and store the relevant information in in-memory storage comprising an in-memory data structure store used as a database or cache.

13. The processing system of claim 12, wherein the instructions further program the one or more processors to:

receive a query from a service for identity values; and utilize a key from the query to obtain the identity values from the in-memory storage, the key comprising a combination of a time slot indicating a time bucket and one or more procedure identifiers associated with network elements, the identity values being stored as key/value data in the in-memory storage.

14. The processing system of claim 12, wherein the one or more sources include any of Mobile Management Entity (MME) data, probe data, and third party data.

15. The processing system of claim 12, wherein the receiving utilizes a message queue.

16. The processing system of claim 12, wherein the receiving, the analyzing and summarizing, the transforming, and the storing is performed at an edge of the mobile network.

17. The processing system of claim 12, wherein the instructions further program the one or more processors to:

determining an alignment of procedures based on the relevant information.

18. The processing system of claim 12, wherein the in-memory storage includes any of an encrypted and unencrypted format for the relevant data.

19. A non-transitory computer-readable medium comprising instructions for programming one or more processors to perform steps of:

receiving data from (i) a data stream from one or more sources or (ii) one or more files, wherein the one or more sources and the one or more files are from systems associated with a mobile network and comprise call trace messages in a plurality of vendor-specific formats corresponding to a plurality of different wireless technologies;

analyzing and summarizing relevant information from the data stream, wherein the relevant information includes data associated with user identities and is processed in near real time by a vendor- and technology-agnostic radio access network parser;

transforming the relevant information Includes-into a vendor- and technology-agnostic common output format, wherein the common output format is a same format for one or more vendor's equipment and one or more wireless technologies; and storing the relevant information in in-memory storage comprising an in-memory data structure store used as a database or cache.

20. The transitory computer-readable medium of claim 19, wherein the steps further include:

receiving a query from a service for identity values; and utilizing a key from the query to obtain the identity values from the in-memory storage, the key comprising a combination of a time slot indicating a time bucket and one or more procedure identifiers associated with network elements, the identity values being stored as key/value data in the in-memory storage.

* * * * *